(12) United States Patent
Huang

(10) Patent No.: US 7,508,476 B2
(45) Date of Patent: Mar. 24, 2009

(54) MULTI-DOMAIN VERTICAL ALIGNMENT LCD PANEL WITH PLURALITY OF MAIN SLITS CORRESPONDING TO EDGE OF DIELECTRIC LINING LAYERS IN PIXEL ELECTRODE OF THIN FILM TRANSISTOR ARRAY

(75) Inventor: Chun-Yi Huang, Dayuan Township, Taoyuan County (TW)

(73) Assignee: Chunghwa Picture Tubes, Ltd., Taiepi (TW)

( * ) Notice: Subject to any disclaimer, the term of this patent is extended or adjusted under 35 U.S.C. 154(b) by 433 days.

(21) Appl. No.: 11/259,425

(22) Filed: Oct. 25, 2005

(65) Prior Publication Data

US 2007/0046878 A1  Mar. 1, 2007

(30) Foreign Application Priority Data

Aug. 25, 2005  (TW) ............................ 94129055 A

(51) Int. Cl.
*G02F 1/1337* (2006.01)
(52) U.S. Cl. .................................... 349/130; 349/129
(58) Field of Classification Search ............... 349/129, 349/130
See application file for complete search history.

(56) References Cited

U.S. PATENT DOCUMENTS

2002/0030781 A1  3/2002  Kim et al. .................... 349/143
2003/0133055 A1  7/2003  Um et al. ...................... 349/43
2004/0070715 A1  4/2004  Ma et al. ..................... 349/130
2005/0140870 A1  6/2005  Kim et al. .................... 349/114

FOREIGN PATENT DOCUMENTS

| CN | 1270326 | 10/2000 |
| CN | 1606125 | 4/2005 |
| CN | 1661448 | 8/2005 |
| JP | 2000-17194 | 6/2000 |
| JP | 2003-043489 | 2/2003 |
| JP | 2004-301878 | 10/2004 |
| JP | 2004-302267 | 10/2004 |

*Primary Examiner*—David Nelms
*Assistant Examiner*—John Heyman
(74) *Attorney, Agent, or Firm*—J.C. Patents

(57) ABSTRACT

A multi-domain vertical alignment liquid crystal display panel, a thin film transistor array, and methods of fabrication the same are provided. The TFT array substrate comprises a substrate, data lines, scan lines and pixel structures. The data lines and the scan lines are arranged on the substrate to define a plurality of pixel regions. Each pixel structure is arranged in the corresponding pixel region. Each pixel structure comprises a TFT, a pixel electrode and a dielectric lining layer. The TFT is electrically connected to the corresponding data line and the corresponding scan line. The pixel electrode having slits is placed upon the TFT and is electrically connected thereto. The dielectric lining layer is disposed on the substrate. Part of the dielectric lining layer is sandwiched between the pixel electrode and the substrate, to make the liquid crystal molecules inside the liquid crystal display have more tilt directions.

13 Claims, 9 Drawing Sheets

MULTI-DOMAIN VERTICAL ALIGNMENT LCD PANEL WITH PLURALITY OF MAIN SLITS CORRESPONDING TO EDGE OF DIELECTRIC LINING LAYERS IN PIXEL ELECTRODE OF THIN FILM TRANSISTOR ARRAY

CROSS-REFERENCE TO RELATED APPLICATION

This application claims the priority benefit of Taiwan application serial no. 94129055, filed on Aug. 25, 2005. All disclosure of the Taiwan application is incorporated herein by reference.

BACKGROUND OF THE INVENTION

1. Field of the Invention

The present invention generally relates to a display panel, an active device array, and methods of fabricating the same. More particularly, the present invention relates to a multi-domain vertical alignment liquid crystal display (LCD) panel, a thin film transistor (TFT) array, and methods of fabricating the same.

2. Description of Related Art

It is the trend that LCD panels are to be with high brightness, high contrast, large display size, and wide view angle. In order to improve the view angle of the LCD panel, several wide-view-angle techniques have been proposed. The popular LCDs with wide view angle include, for example, the multi-domain vertical alignment (MVA) LCD, the in-plane switching (IPS) LCD, and the fringe field switching (FFS) LCD. For an MVA-LCD, plural slits are formed on the pixel electrode, for example. Plural protrusions are disposed on the color filter array substrate corresponding thereto. By matching the slits and the protrusions, liquid crystal molecules in the liquid crystal layer can tile in various directions and the wide-view-angle performance can be achieved.

FIG. 1 is a top view schematically illustrating a pixel of a conventional MVA-LCD. Referring to FIG. 1, a scan line 102, a data line 104, a thin film transistor (TFT) 120 and a pixel electrode 112 are disposed on a substrate (not shown). The thin film transistor (TFT) 120 includes a gate 106, a channel 108 and the source/drain 110a/110b, wherein the gate 106 is electrically connected to the scan line 102, the source 110a is electrically connected to the data line 104, and the drain 110b is electrically connected to the pixel electrode 112 via a contact opening 116.

Generally, in order to increase the viewing angle of the LCD, a plurality of strip slits 114 are formed in the pixel electrode 112, and a plurality of stripe protrusions 118 are formed on the opposite substrate (not shown) having a color filter layer. Therefore, the liquid crystal molecules disposed between the two substrates may have a variety of tilt directions by the aid of the slit 114 and the protrusion 118. Accordingly, the range of the view angle of the LCD may be enhanced.

Although the range of the view angle at the horizontal and vertical direction of the MVA-LCD described above is enhanced with the aid of the protrusions 118 and the slits 114, however, a color shift of an image in medium gray level may occur from a normal vision to a slant vision and thus result in a drop of display quality. FIG. 2 is a diagram illustrating the relationship between the applied voltage and the transmittance of a conventional MVA-LCD, wherein R-line refers to the V-T curve in a normal vision, and Q-line refers to the V-T curve in a slant vision. Referring to FIG. 2, under a low driving voltage, the transmittance in the slant vision is greater than that in the normal vision. Therefore, the light leakage and the color shift of the MVA-LCD occur in the slant vision.

SUMMARY OF THE INVENTION

Accordingly, the present invention is directed to a TFT array, wherein changing the thickness of layers to increase the tilt directions of liquid crystal molecules and thus resolve the color shift or the light leakage forms structures with different heights.

The present invention is further directed to a MVA-LCD panel, wherein the TFT array mentioned above is used for providing more different cell gaps to increase the tilt directions of liquid crystal molecules and thus resolve the color shift or the light leakage.

In addition, the present invention is directed to a method for fabricating the TFT array mentioned above, wherein the tilt directions of liquid crystal molecules in the MVA-LCD panel can be increased, and the problem of color shift or light leakage can therefore be solved.

Furthermore, the present invention is directed to a method for fabricating the MVA-LCD panel mentioned above, wherein the tilt directions of liquid crystal molecules can be increased, and the problem of color shift or light leakage can therefore be solved.

The present invention provides a TFT array comprising: a substrate; a plurality of data lines and scan lines, disposed on the substrate for defining a plurality of pixel regions; a plurality of pixel structures, which are disposed in the pixel regions, electrically connected to the data lines and the scan lines, and driven by the data lines and the scan lines. Each pixel structure comprises a thin film transistor, electrically connected to the data lines and the scan lines; a pixel electrode, disposed over and electrically connected to the thin film transistor, the pixel electrode having a plurality of main slits; and a dielectric lining layer, disposed over the substrate and located between a portion of the pixel electrode and the substrate.

According to an embodiment of the present invention, the main slits are corresponding to the edge of the dielectric lining layers.

According to an embodiment of the present invention, each dielectric lining layer comprises a first lining sub-layer and a second lining sub-layer, and the height of the first lining sub-layer is different from that of the second lining sub-layer.

According to an embodiment of the present invention, each pixel electrode further has a plurality of fine slits, which are disposed at both sides of the main slits.

According to an embodiment of the present invention, each thin film transistor comprises: a gate, disposed over the substrate; a gate insulating layer, disposed over the substrate and covering the gate; a channel, disposed over the gate insulating layer and corresponding to the gate; a source/drain, disposed over the channel and electrically connected to the corresponding pixel electrode; and a passivation layer, disposed over the substrate and covering the channel and the source/drain.

According to an embodiment of the present invention, the gate insulating layer and the passivation layer may further extend out of the thin film transistor for constituting the dielectric lining layer.

The present invention provides a MVA-LCD panel, comprising: the TFT array mentioned above; an opposed substrate, disposed in corresponding to the thin film transistor array; and a liquid crystal layer, disposed between the thin film transistor array and the opposed substrate.

According to an embodiment of the present invention, the opposed substrate may be a color filter.

According to an embodiment of the present invention, the opposed substrate comprises a plurality of alignment protrusions. In addition, the alignment protrusions may take strip-shapes and are parallel to the main slits.

The present invention provides a method of fabricating a TFT array. First, a substrate is provided, wherein a plurality of pixel regions are defined on the substrate. Next, a gate metal layer is formed and then patterned for forming a gate in each pixel region. Then, a gate insulating layer is formed, wherein the gate insulating layer covers the gates. Thereafter, a plurality of channels is formed over the gate insulating layer, wherein the channels are corresponding to the gates. Next, a source/drain metal layer is formed and then patterned for forming a source/drain over each channel. Then, a passivation layer is formed over the substrate for covering the source/drains and the channels. Thereafter, the passivation layer and the gate insulating layer are patterned for forming a dielectric lining layer in each pixel region on the substrate. Next, a electrode layer is formed over the substrate and then patterned for forming a pixel electrode having a plurality of main slits in each pixel region, wherein the pixel electrode is electrically connected to the corresponding source/drain through the passivation layer, and a portion of the pixel electrode covers the corresponding dielectric lining layer.

The present invention also provides a method of fabricating a MVA-LCD panel. Besides the steps of forming the TFT array mentioned above, the fabricating method further comprises the steps of providing an opposed substrate and then forming a liquid crystal layer between the substrate and the opposed substrate.

According to the method of fabricating the TFT array and the MVA-LCD panel, the step of patterning the passivation layer and the gate insulating layer may comprise performing a mask process for defining contact openings in the passivation layer and forming the dielectric lining layer in each pixel region simultaneously, wherein the contact openings correspondingly expose a portion of each source/drain. In addition, the step of patterning the passivation layer and the gate insulating layer may further comprise performing another mask process for removing part of the dielectric lining layer to form a plurality of first lining sub-layers and second lining sub-layers, wherein the height of the first lining sub-layers is different from that of the second lining sub-layers.

In the present invention, the dielectric lining layer is formed with the gate insulating layer and the passivation layer on the TFT array, thus the thickness of the dielectric lining layer can be changed without any additional mask, and more different cell gaps are provided in the LCD panel. Consequently, the tilt directions of liquid crystal molecules are increased, and thus the color shift or the light leakage can be eliminated.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
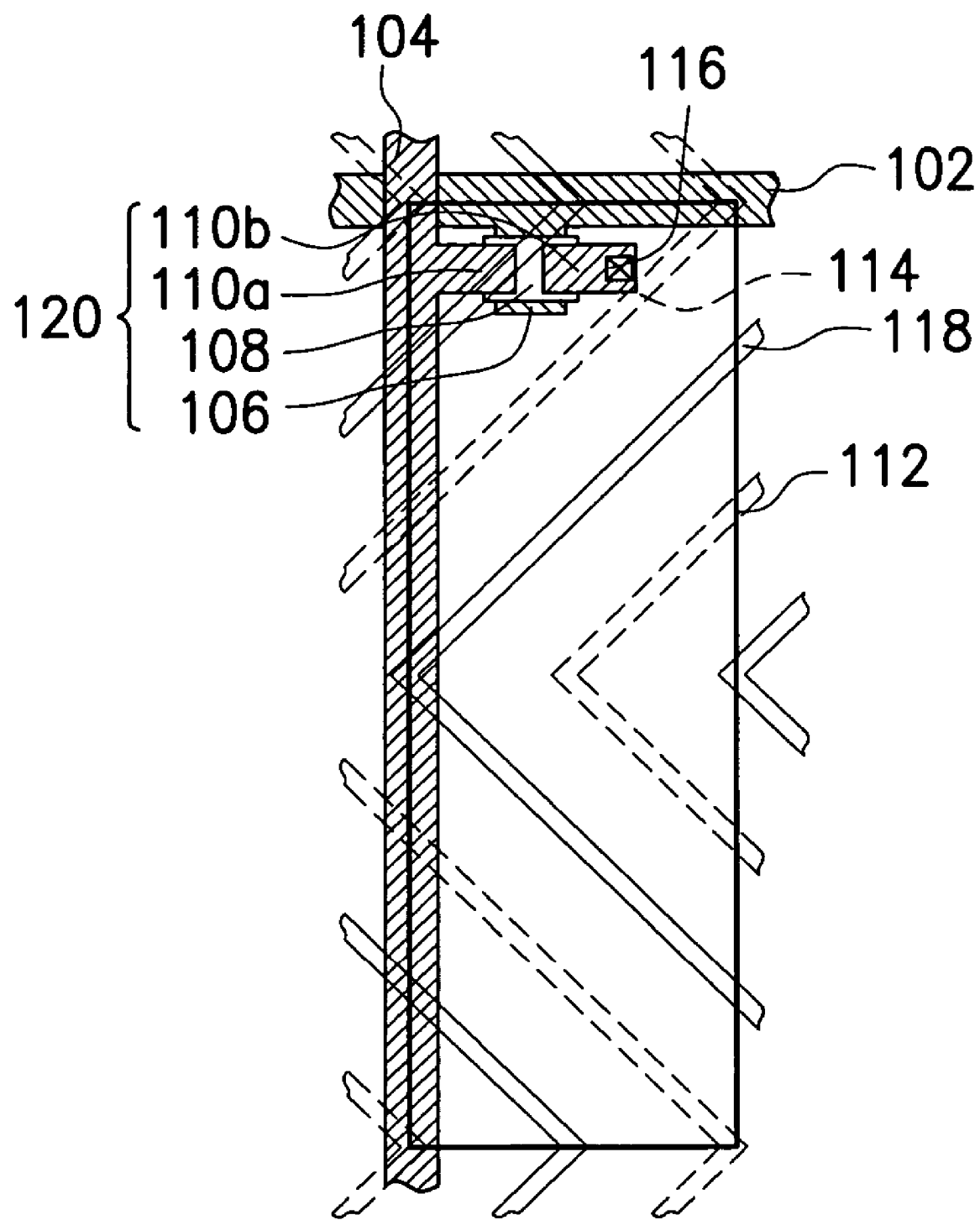
FIG. 1 is a top view schematically illustrating a pixel of a conventional MVA-LCD.
Figure 2:
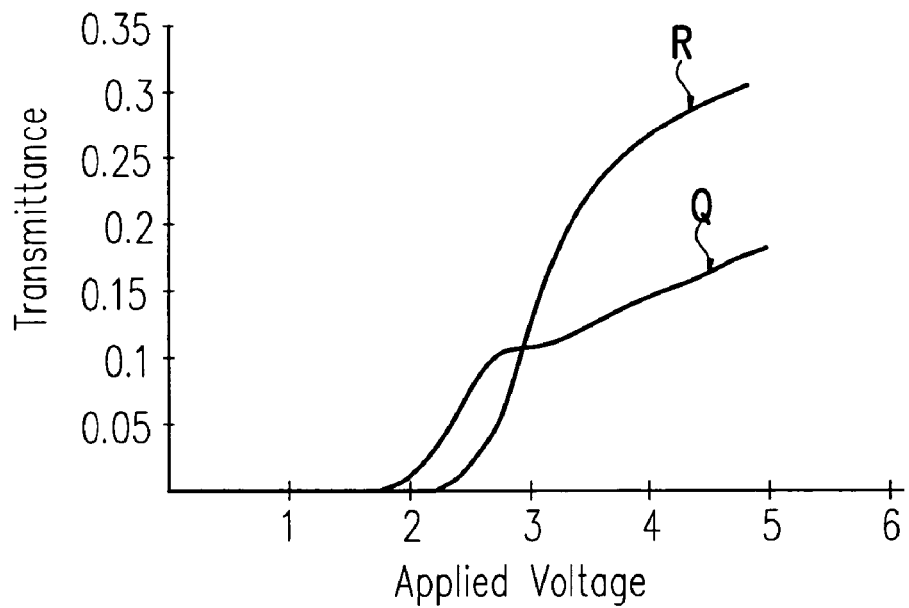
FIG. 2 is a diagram illustrating the relationship between the applied voltage and the transmittance of a conventional MVA-LCD

Reference will now be made in detail to the present preferred embodiments of the invention, examples of which are illustrated in the accompanying drawings. Wherever possible, the same reference numbers are used in the drawings and the description to refer to the same or like parts.

Figure 3:
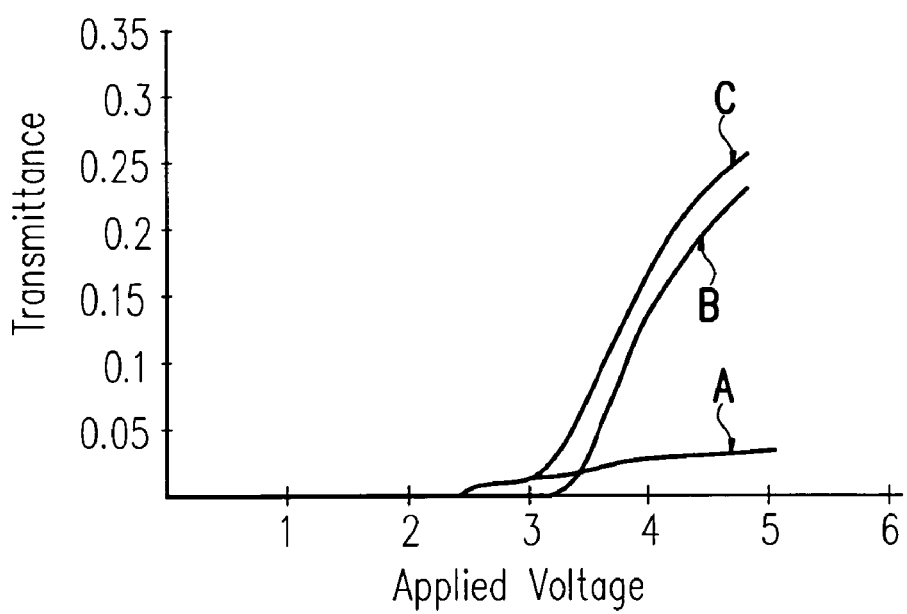
FIG. 3 is a diagram illustrating the relationship between the applied voltage and the transmittance of a MVA-LCD according to the present invention.

FIG. 3 is a diagram illustrating the relationship between the applied voltage and the transmittance of a MVA-LCD according to the present invention. Referring to FIG. 3, curve A and curve B represent V-T curves corresponding to different cell gaps, and curve C refers to a hybrid V-T curve derived from curve A and curve B. The present invention forms different cell gaps in one panel for attaining compensation by the different cell gaps. Therefore, the difference between V-T curves in the slant vision and the normal vision can be reduced, and the light leakage or the color shift can be eliminated.

Figure 4A:
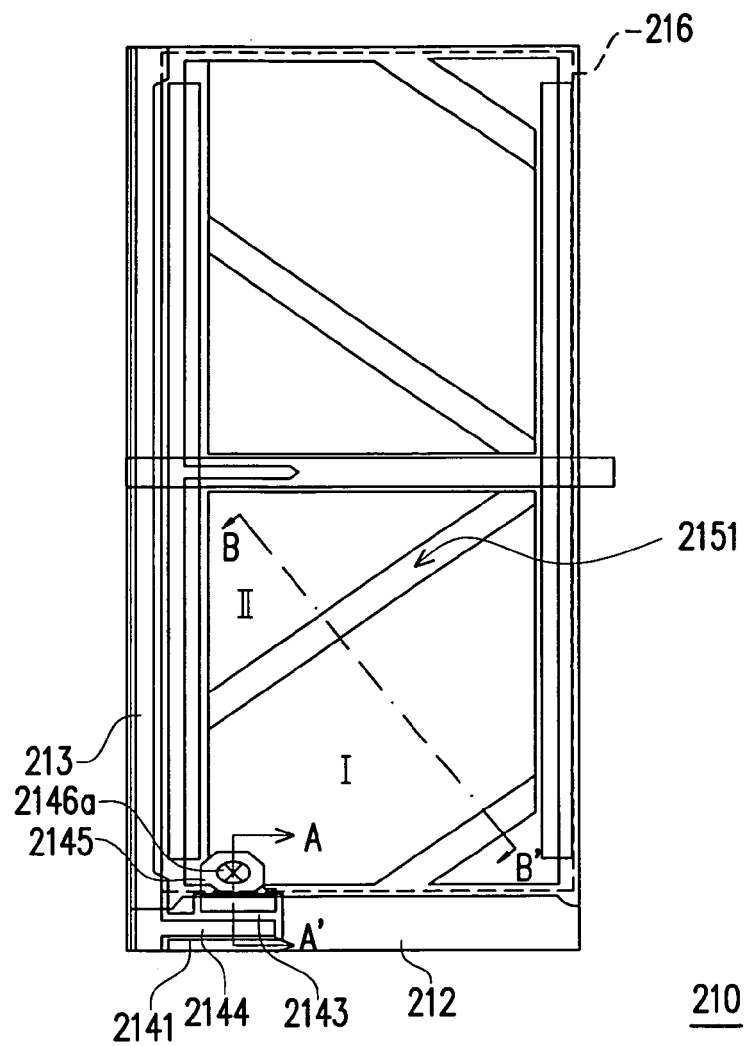
FIG. 4A is a partial top view schematically illustrating a TFT array of a MVA-LCD panel according to a first embodiment of the present invention.
Figure 4B:
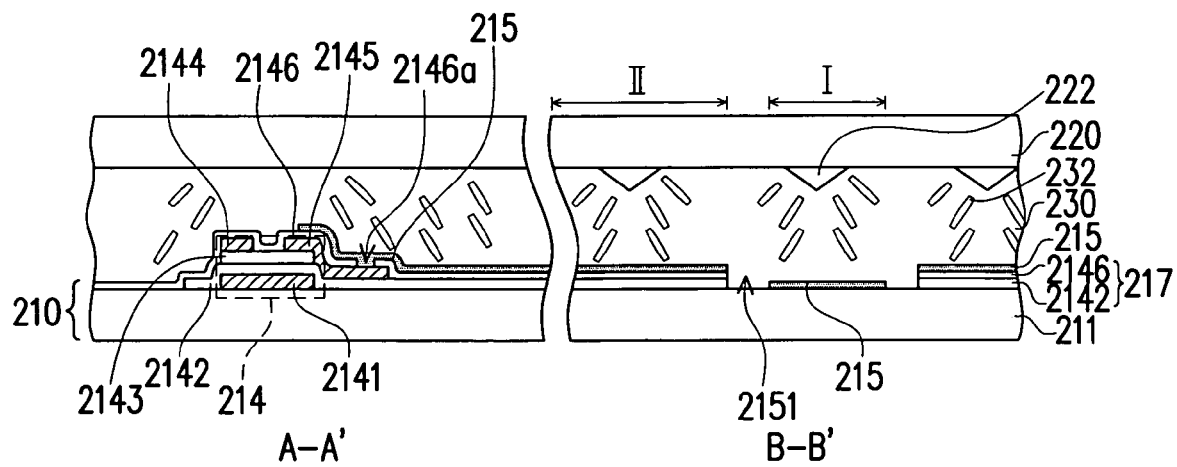
FIG. 4B is a cross-sectional view schematically illustrating the MVA-LCD panel along line A-A' and line B-B'.

FIG. 4A is a partial top view schematically illustrating a TFT array of a MVA-LCD panel according to a first embodiment of the present invention. FIG. 4B is a cross-sectional view schematically illustrating the MVA-LCD panel along line A-A' and line B-B'.

Referring to FIG. 4A, the MVA-LCD panel 200 comprises a TFT array 210, a color filter 220, and a liquid crystal layer 230. The TFT array 210 and the color filter 220 are substantially parallel. In addition, the liquid crystal layer 230 comprises a plurality of liquid crystal molecules 232 and is disposed between the TFT array 210 and the color filter 220.

The TFT array 210 comprises a substrate 211, a plurality of scan lines 212, a plurality of data lines 213, and a plurality of pixel structures. The scan lines 212 and data lines 213 are disposed on the substrate 211 for defining a plurality of pixel regions 216. The pixel structure are disposed in the pixel regions 216 respectively and electrically connected to the scan lines 212 and the data lines 213.

Each pixel structure comprises a TFT 214, a pixel electrode 215, and a dielectric lining layer 217. Wherein, the TFT 214 is disposed in the corresponding pixel regions 216 and electrically connected to the corresponding scan line 212 and data line 213 for being driven by the same. Each TFT 214 comprises a gate 2141, a gate insulating layer 2142, a channel 2143, a source 2144, a drain 2145, and a passivation layer 2146. The gate 2141 is disposed over the substrate 211. The gate insulating layer 2142 is disposed over the substrate 211 and covers the gate 2141. In addition, the channel 2143 is disposed over the gate insulating layer 2142 and corresponding to the gate 2141. The source/drain 2144/2145 is disposed over the channel 2143, and the source 2144 is electrically connected to the corresponding data line 213. The passivation layer 2146 is disposed over the source/drain 2144/2145 for preserving the gate 2141, the gate insulating 2142, the channel 2143, and the source/drain 2144/2145 from humidity or damage. Moreover, the passivation layer 2146 has a contact opening 2146a, and the pixel electrode 215 is electrically connected to the drain 2145 of the corresponding TFT 214 in the pixel region 216 via the contact opening 2146a.

In the present invention, the dielectric lining layer 217 may be constituted by the gate insulating layer 2142 and the passivation layer, which extends from the TFT 214. The method for fabricating the dielectric lining layer 217 is, for example, removing the gate insulating layer 2142 and the passivation layer extending from the TFT 214 as forming the contact opening 2146a in the passivation layer 2146. In addition, the pixel electrode 215 may have a plurality of main slits 2151, which are parallel and corresponding to the edge of the dielectric lining layer 217.

The color filter 220 is parallel to the TFT array 210. The liquid crystal layer 230 is composed of a plurality of liquid crystal molecule 232 and disposed between the TFT array 210 and the color filter 220. Wherein, a plurality of alignment protrusions 222 are disposed on the surface of the color filter 220 and cooperate with the main slits 2151 of the pixel electrodes 215 to make the liquid crystal molecules tilting into different directions. In the embodiment, the alignment protrusions 222 may take strip-shapes and are parallel to the main slits 2151.

Referring to FIGS. 4A and 4B, a part of the pixel electrode 215 is formed on the substrate 211, and the other part of the pixel electrode 215 is formed on the dielectric lining layer 217, wherein a difference in height is produced between the region I and the region II on the TFT array 210. By the assistance of the two regions with different heights, more different domains are provided in the present invention, and thus the difference of the V-T curves in a normal vision and a slant vision can be reduced. Specifically, the region I and the region II have different cell gaps for producing different electric fields to make the liquid crystal molecules tilting into different directions. A self-compensation can therefore be achieved to eliminate the color shift or the light leakage.

Figure 5:
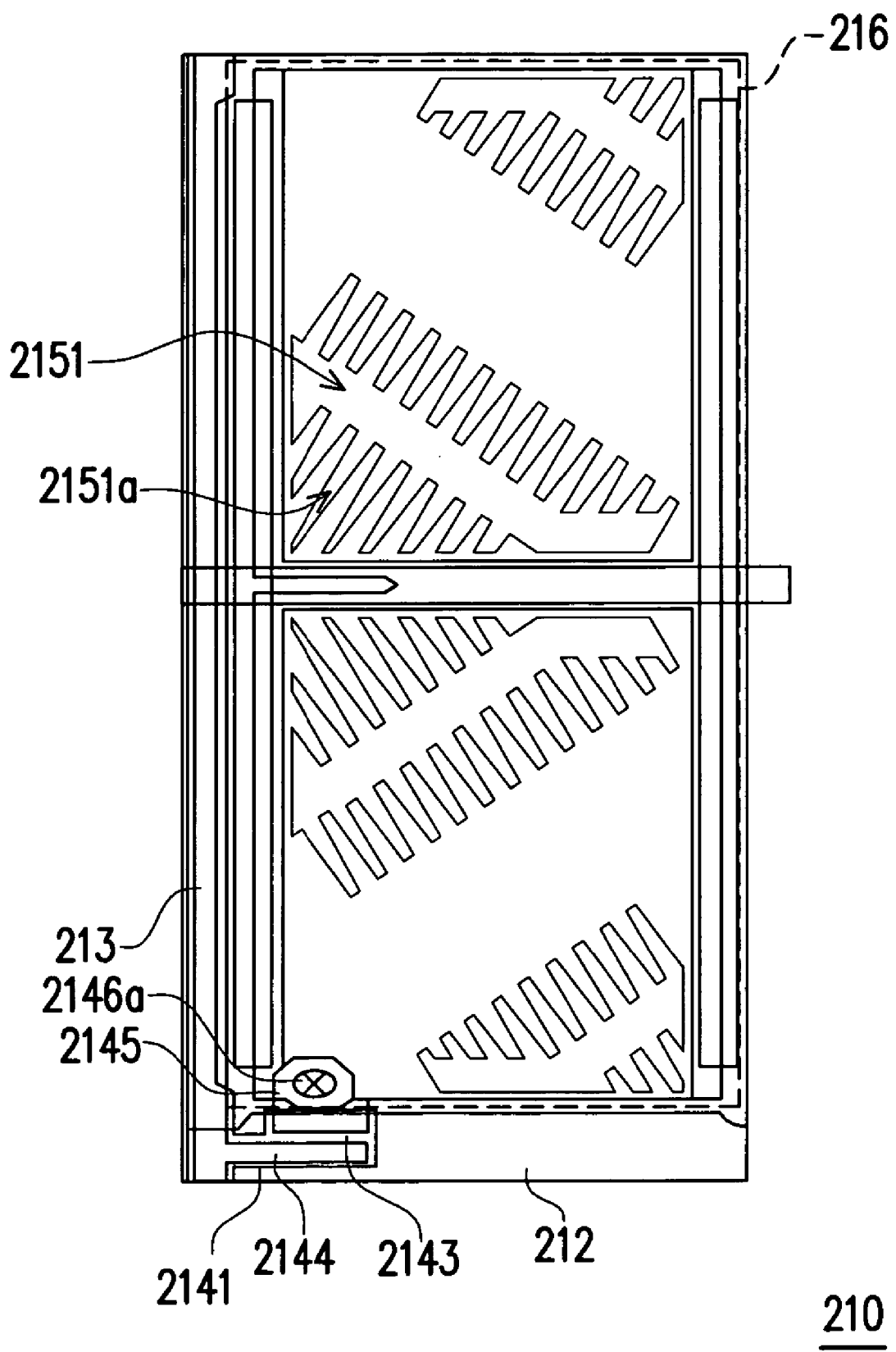
FIG. 5 schematically illustrates another type of the TFT array 210.

Referring to FIG. 5, which schematically illustrates another type of the TFT array 210, wherein a plurality of fine slits 2151 a is formed at both sides of each main slit 2151 on the pixel electrodes 215. The fine slits 2151 a can improve the response speed of the MVA-LCD panel 200.

Figure 6A:
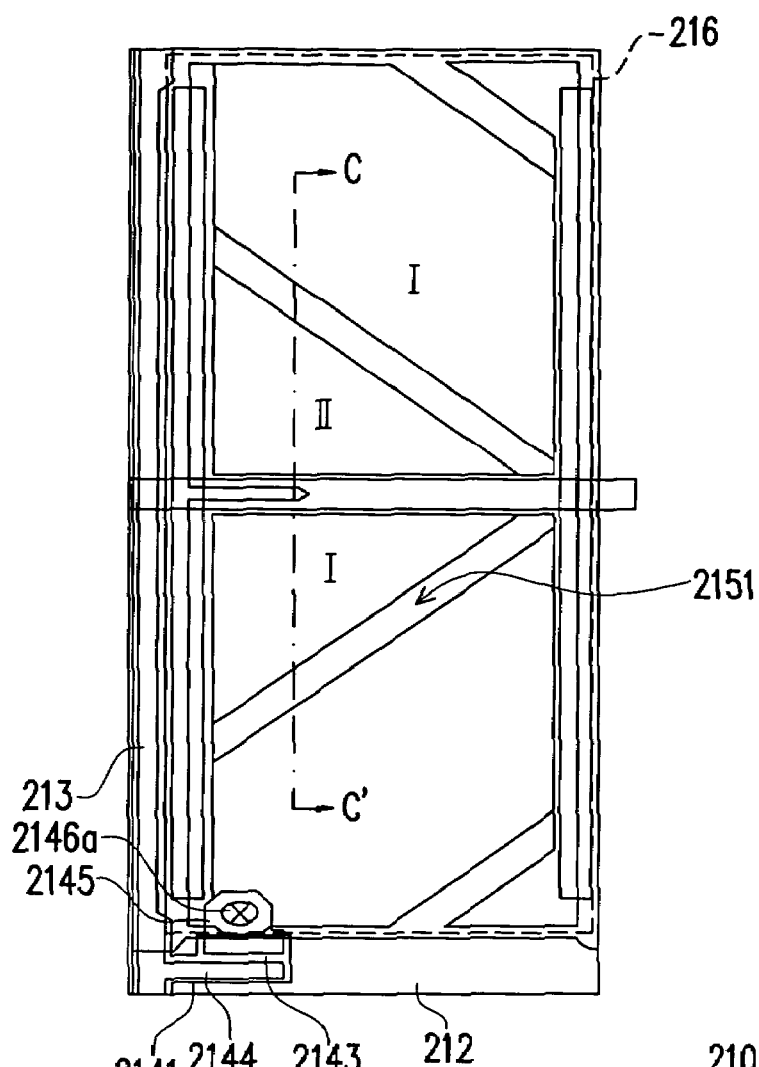
FIG. 6A is a partial top view schematically illustrating a TFT array of a MVA-LCD panel according to a second embodiment of the present invention.
Figure 6B:
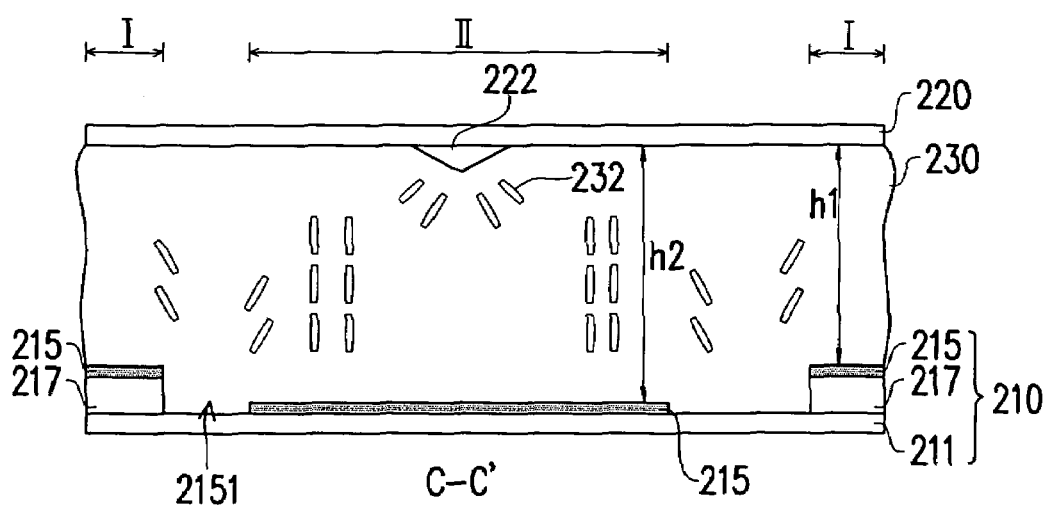
FIG. 6B is a cross-sectional view schematically illustrating the MVA-LCD panel along line C-C'.

FIG. 6A is a partial top view schematically illustrating a TFT array of a MVA-LCD panel according to a second embodiment of the present invention. FIG. 6B is a cross-sectional view schematically illustrating the MVA-LCD panel along line C-C'.

The structure illustrated in the second embodiment is similar to that in the first embodiment. Comparing to those in the first embodiment, positions of the removed part and the remained part of the dielectric lining layer 217 are changed. Similarly, the second embodiment forms more domains by the region I and the region II, which have different cell gaps, to reduce the difference of the V-T curves in a normal vision and a slant vision.

Figure 7A:
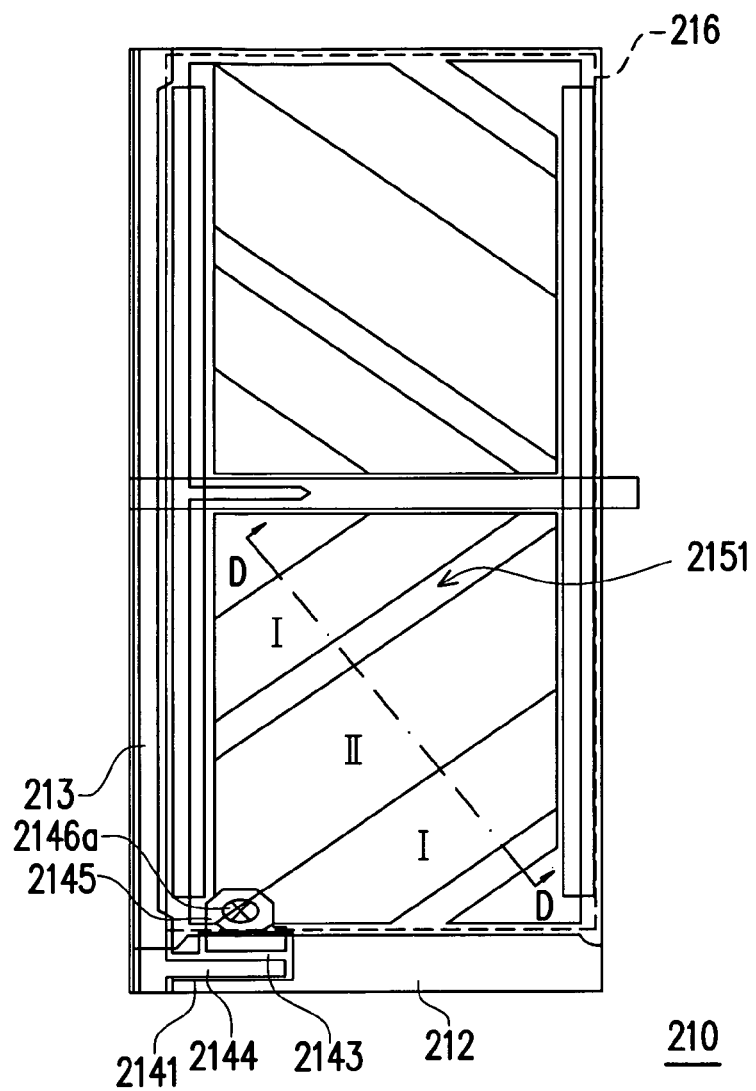
FIG. 7A is a partial top view schematically illustrating a TFT array of a MVA-LCD panel according to a third embodiment of the present invention.
Figure 7B:
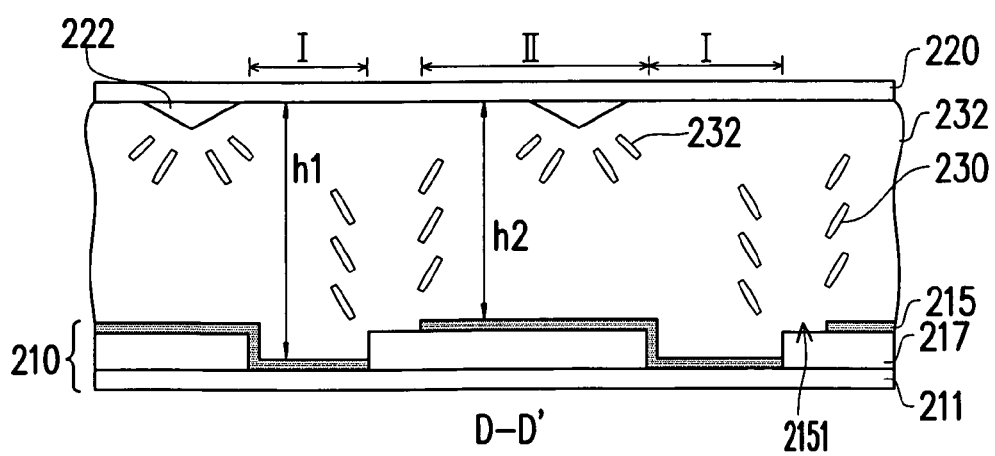
FIG. 7B is a cross-sectional view schematically illustrating the MVA-LCD panel along line D-D'.

FIG. 7A is a partial top view schematically illustrating a TFT array of a MVA-LCD panel according to a third embodiment of the present invention. FIG. 7B is a cross-sectional view schematically illustrating the MVA-LCD panel along line D-D'.

Similarly, the third embodiment removes part of the dielectric lining layer 217, and then forms the pixel electrodes 215 on the substrate 211 and part of the dielectric lining layer 217. It should be noted that only a part of the dielectric lining layer 217 for forming different cell gaps between two adjacent main slits 2151 of the pixel electrode 215. By the different cell gaps, the liquid crystal molecules can tilt into different directions, and the self-compensation can therefore be achieved.

Figure 8A:
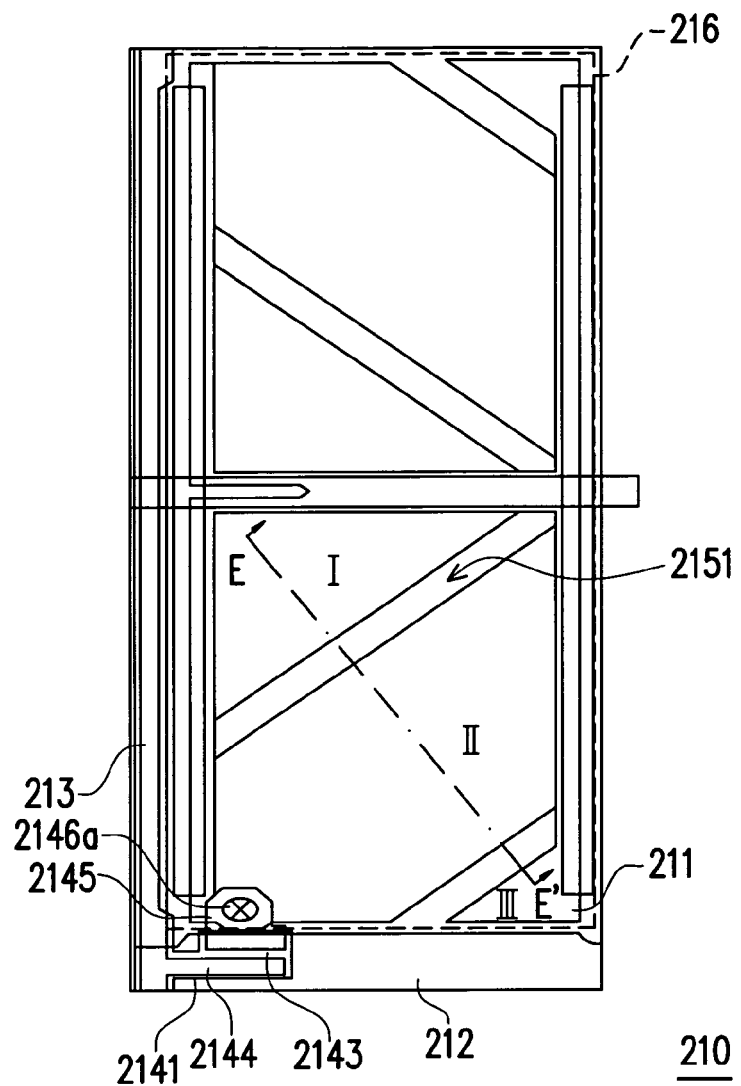
FIG. 8A is a partial top view schematically illustrating a TFT array of a MVA-LCD panel according to a third embodiment of the present invention.
Figure 8B:
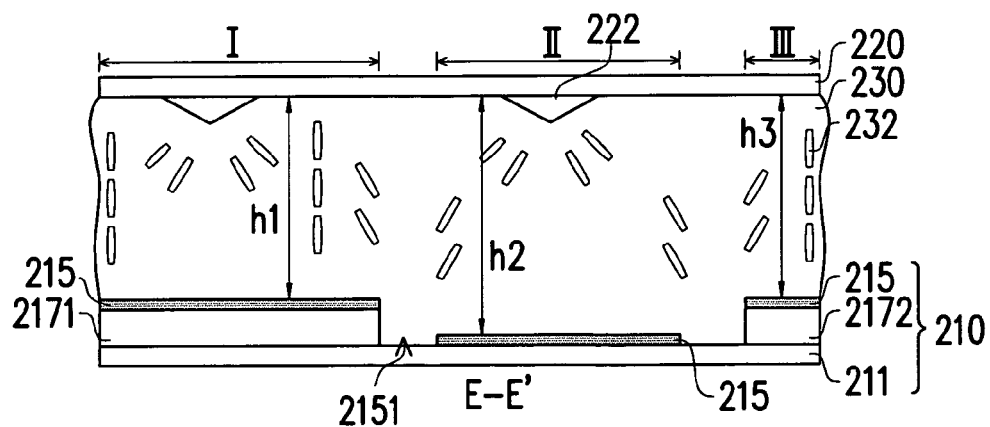
FIG. 8B is a cross-sectional view schematically illustrating the MVA-LCD panel along line D-D'.

FIG. 8A is a partial top view schematically illustrating a TFT array of a MVA-LCD panel according to a third embodiment of the present invention. FIG. 8B is a cross-sectional view schematically illustrating the MVA-LCD panel along line D-D'. In the present invention, the dielectric lining layer 217 comprises a first lining sub-layer 2171 and a second lining sub-layer 2172. There are three different cell gaps h1, h2, and h3 being formed in the MVA-LCD panel 200 by the first lining sub-layer 2171 and the second lining sub-layer 2172 to provide more domains.

Accordingly, besides the embodiments mentioned above, the present invention can further form more than two lining sub-layers with different heights on the substrate, and thus the liquid crystal molecules have more tilt directions.

FIG. 9A to 9G schematically illustrate the fabricating process of the TFT arrays 210 according to the first, the second and the third embodiments of the present invention.

Figure 9A:
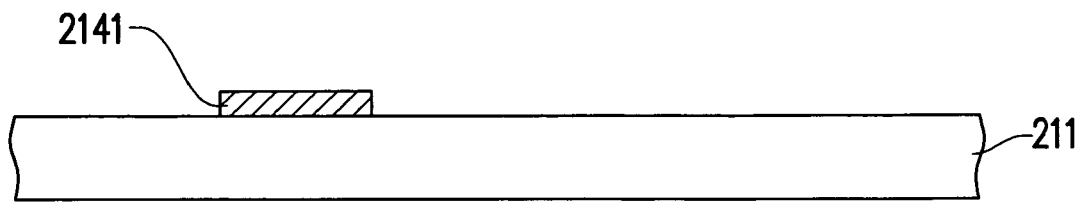
FIG. 9A to 9G schematically illustrate the fabricating process of the TFT arrays 210 according to the first, the second and the third embodiments of the present invention.
Figure 9B:
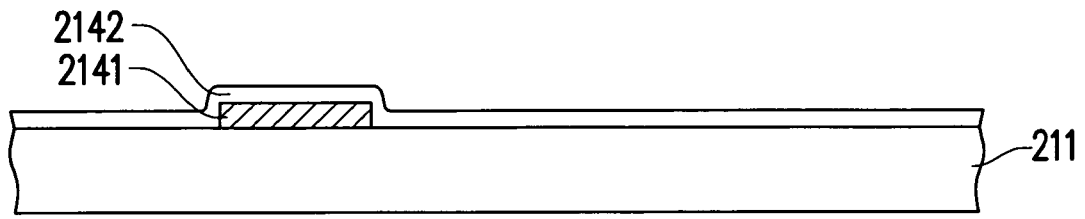

First, the substrate 211 is provided, wherein a plurality of pixel regions 216 arranged in matrix is defined on the substrate, as shown in FIG. 4A. Referring to FIG. 9A, a gate metal layer is formed on the substrate 211, and a photolithography/etching process is performed to pattern the gate metal layer to form the gate 2141 in each pixel region 216, as shown in FIG. 4A. Next, referring to FIG. 9B, the gate insulating layer 2142 is formed on the substrate 211 for covering the gate 2141. The gate insulating layer 2142 may be formed by performing the plasma enhance chemical vapor deposition (PECVD) technique on the substrate.

Figure 9C:
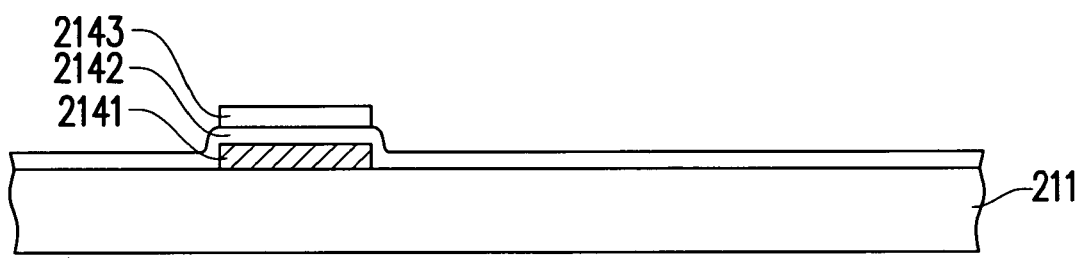
Figure 9D:
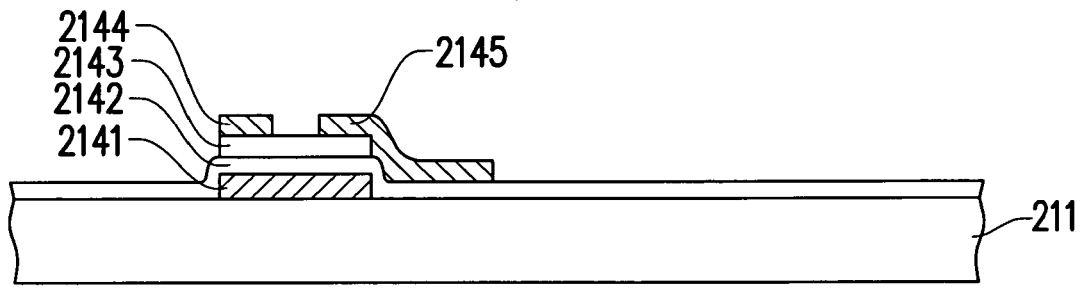

Then, referring to FIG. 9C, the channel 2143 is formed on the gate insulating layer 2142 corresponding to the gate 2141. Next, referring to FIG. 9D, a source/drain metal layer is formed on the substrate 211, and a photolithography/etching process is performed to pattern the source/drain metal layer to formed the source/drain 2144/2145 on each channel 2143.

Figure 9E:
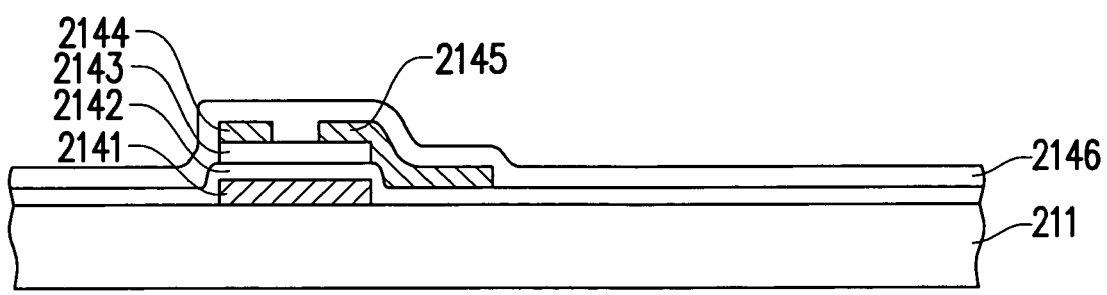

After that, referring to FIG. 9E, the passivation layer 2146 is formed on the substrate 211 for covering the channel 2143, and the source/drain 2144/2145. Then, referring to FIG. 9F, a mask process is performed to pattern the passivation layer 2146 and the gate insulating layer 2142, wherein the contact opening 2146a is defined in the passivation layer 2146 and the dielectric lining layer 217 is formed in the pixel regions 216. The dielectric lining layer 217 comprises the gate insulating layer 2142 and the passivation layer 2146 extending outside the TFTs 214.

Figure 9F:
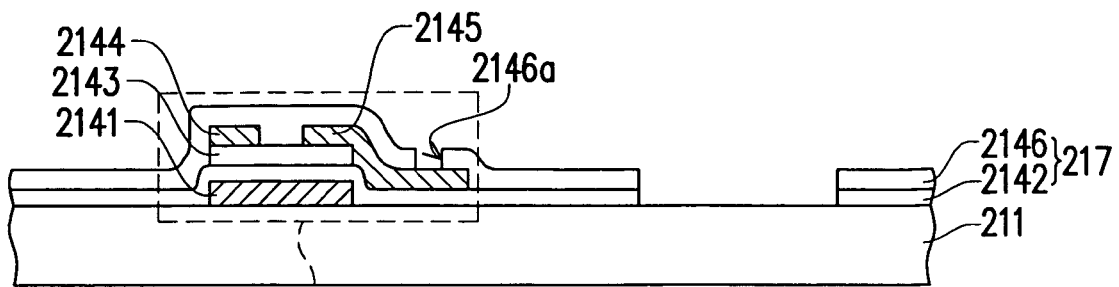
Figure 9G:
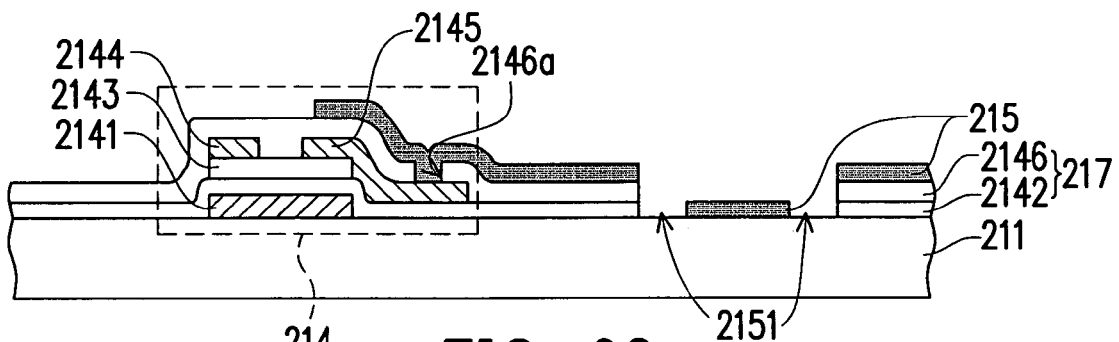

Next, referring to FIG. 9G, a electrode layer is formed on the substrate 211 and is patterned to form the pixel electrode 215 having parallel main slits 2151 in each pixel region 216. The pixel electrode 215 is electrically connected to the drain 2145 of the TFT 214 via the contact opening 2146a of the passivation layer 2146. A part of the pixel electrode 215 is disposed on the dielectric lining layer 217, and the other part is disposed on the substrate 211, therefore two region with different cell gaps are formed on the TFT array 210. Then, with different positions of the dielectric lining layer 217, the TFT arrays 210 according to the first, the second, and the third embodiments of the present invention can be formed.

Figure 10:
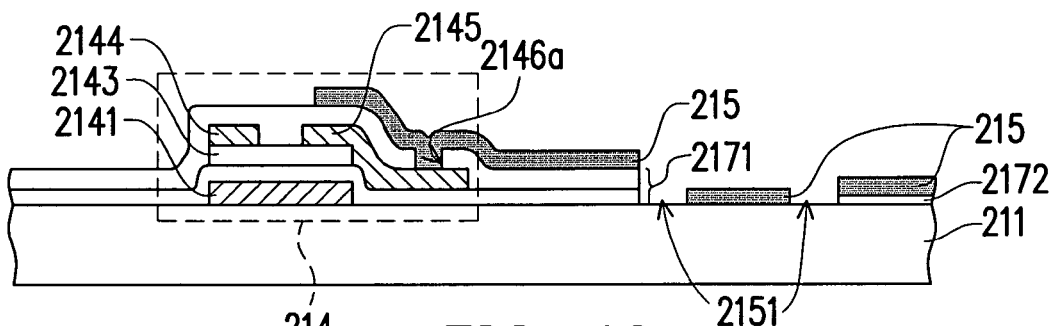
FIG. 10 illustrates forming the first lining sub-layer and the second lining sub-layer with different heights on the substrate.

In addition, after the step illustrated in FIG. 9F, an additional mask process can be performed to remove a part of the dielectric lining layer 217. Thus, referring to FIG. 10, the first lining sub-layer 2171 and the second lining sub-layer 2172 with different heights are formed on the substrate 211. Next, the pixel electrode 215 is formed on the substrate to form the TFT array 210 mentioned in the fourth embodiment.

Figure 11:
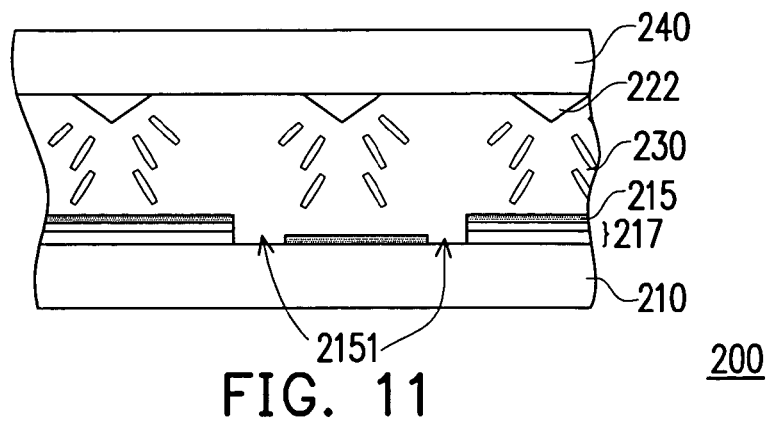
FIG. 11 schematically illustrates a MVA-LCD panel of the present invention.

Referring to FIG. 11, which schematically illustrates a MVA-LCD panel of the present invention. When fabricating a MVA-LCD panel 200, the opposed substrate 240, such as color filter, is provide. And then the liquid crystal layer 230 is formed between the TFT array 210 mentioned above and the opposed substrate 240 to form the MVA-LCD panel 200 mentioned in the above embodiments. Similarly, the opposed substrate 240 may have plural alignment protrusions 222, which cooperate with the main slits 2151 of the pixel electrodes 215 for attaining the effect of multi-domain vertical alignment.

In summary, the dielectric lining layer can be formed as patterning the gate insulating layer and the passivation layer on the TFT array. Therefore, the cell gap of the LCD panel can be modified without any additional mask process. The liquid crystal molecules have more different tilt directions, and the color shift or the light leakage can be drastically eliminated.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A thin film transistor array, comprising:
    a substrate;
    a plurality of data lines and scan lines, disposed on the substrate for defining a plurality of pixel regions;
    a plurality of pixel structures, which are disposed in the pixel regions, electrically connected to the data lines and the scan lines, and driven by the data lines and the scan lines, wherein each pixel structure comprises:
    a thin film transistor, electrically connected to the data lines and the scan lines;
    a pixel electrode, disposed over and electrically connected to the thin film transistor, the pixel electrode having a plurality of main slits; and
    a dielectric lining layer, disposed over the substrate and located between a portion of the pixel electrode and the substrate,
    wherein the main slits are corresponding to the edge of the dielectric lining layers.

2. The thin film transistor array according to claim 1, wherein each dielectric lining layer comprises a first lining sub-layer and a second lining sub-layer, and the height of the first lining sub-layer is different from that of the second lining sub-layer.

3. The thin film transistor array according to claim 1, wherein each pixel electrode further has a plurality of fine slits, which are disposed at both sides of the main slits.

4. The thin film transistor array according to claim 1, wherein each thin film transistor comprises:
    a gate, disposed over the substrate;
    a gate insulating layer, disposed over the substrate and covering the gate;
    a channel, disposed over the gate insulating layer and corresponding to the gate;
    a source/drain, disposed over the channel and electrically connected to the corresponding pixel electrode; and
    a passivation layer, disposed over the substrate and covering the channel and the source/drain.

5. The thin film transistor array according to claim 4, wherein the gate insulating layer and the passivation layer further extend out of the thin film transistor for constituting the dielectric lining layer.

6. A multi-domain vertical alignment liquid crystal display panel, comprising:
    a thin film transistor array, comprising:
    a substrate;
    a plurality of data lines and scan lines, disposed on the substrate for defining a plurality of pixel regions;
    a plurality of pixel structures, which are disposed in the pixel regions, electrically connected to the data lines and the scan lines, and driven by the data lines and the scan lines, wherein each pixel structure comprises:
    a thin film transistor, electrically connected to the data lines and the scan lines;
    a pixel electrode, disposed over and electrically connected to the thin film transistor, the pixel electrode having a plurality of main slits;
    a dielectric lining layer, disposed over the substrate and located between a portion of the pixel electrode and the substrate;
    an opposed substrate, disposed in corresponding to the thin film transistor array; and
    a liquid crystal layer, disposed between the thin film transistor array and the opposed substrates,
    wherein the main slits are corresponding to the edge of the dielectric lining layers.

7. The multi-domain vertical alignment liquid crystal display panel according to claim 6, wherein each dielectric lining layer comprises a first lining sub-layer and a second lining sub-layer, and the height of the first lining sub-layer is different from that of the second lining sub-layer.

8. The multi-domain vertical alignment liquid crystal display panel according to claim 6, wherein each pixel electrode further has a plurality of fine slits, which are disposed at both sides of the main slits.

9. The multi-domain vertical alignment liquid crystal display panel according to claim 6, wherein each thin film transistor comprises:
    a gate, disposed over the substrate;
    a gate insulating layer, disposed over the substrate and covering the gate;
    a channel, disposed over the gate insulating layer and corresponding to the gate;
    a source/drain, disposed over the channel and electrically connected to the corresponding pixel electrode; and
    a passivation layer, disposed over the substrate and covering the channel and the source/drain.

10. The multi-domain vertical alignment liquid crystal display panel according to claim 9, wherein the gate insulating layer and the passivation layer further extend out of the thin film transistor for constituting the dielectric lining layer.

11. The multi-domain vertical alignment liquid crystal display panel according to claim 6, wherein the opposed substrate is a color filter.

12. The multi-domain vertical alignment liquid crystal display panel according to claim 6, wherein the opposed substrate comprises a plurality of alignment protrusions.

13. The multi-domain vertical alignment liquid crystal display panel according to claim 12, wherein the alignment protrusions take strip-shapes and are parallel to the main slits.

* * * * *